US009212565B2

(12) United States Patent
Dorshimer et al.

(10) Patent No.: US 9,212,565 B2
(45) Date of Patent: Dec. 15, 2015

(54) REAR MOUNTED WASH MANIFOLD RETENTION SYSTEM

(71) Applicant: EcoServices, LLC, Farmington, CT (US)

(72) Inventors: Kurt Dorshimer, Fayetteville, GA (US); William J. Welch, Madison, CT (US); Robert M. Rice, Huntsville, AL (US); Sebastian Nordlund, Sundbyberg (SE); Wayne Zadrick, Bristol, CT (US)

(73) Assignee: EcoServices, LLC, Farmington, CT (US)

( * ) Notice: Subject to any disclaimer, the term of this patent is extended or adjusted under 35 U.S.C. 154(b) by 322 days.

(21) Appl. No.: 13/799,613

(22) Filed: Mar. 13, 2013

(65) Prior Publication Data
US 2014/0260308 A1    Sep. 18, 2014

(51) Int. Cl.
F16L 3/04    (2006.01)
F01D 25/00    (2006.01)
F02C 7/143    (2006.01)
F16L 33/00    (2006.01)
F16L 37/00    (2006.01)

(52) U.S. Cl.
CPC .............. *F01D 25/002* (2013.01); *F02C 7/1435* (2013.01); *F05D 2250/71* (2013.01); *F05D 2260/30* (2013.01); *F16L 33/00* (2013.01); *F16L 37/00* (2013.01)

(58) Field of Classification Search
CPC .......... F02C 7/1435; F02C 7/00; F16L 33/00; F16L 37/00
USPC .......... 134/137, 15.01, 15.04, 15.09; 248/56, 248/64, 65
See application file for complete search history.

(56) References Cited

U.S. PATENT DOCUMENTS

| 2,724,736 | A | * | 11/1955 | Klumpp, Jr. .............. 174/153 G |
| 4,436,266 | A | * | 3/1984 | Gerding ...................... 248/74.1 |
| 5,868,860 | A | | 2/1999 | Asplund |
| 5,893,538 | A | * | 4/1999 | Onishi et al. .................... 248/65 |
| 5,971,329 | A | * | 10/1999 | Hickey .......................... 248/68.1 |
| 7,159,496 | B2 | | 1/2007 | Maes |
| 7,172,161 | B2 | * | 2/2007 | Rosemann et al. .......... 248/68.1 |
| D548,899 | S | | 8/2007 | Asplund |
| 7,297,260 | B2 | | 11/2007 | Hjerpe et al. |
| 7,445,677 | B1 | | 11/2008 | Asplund |
| 7,497,220 | B2 | | 3/2009 | Asplund et al. |
| 7,815,743 | B2 | | 10/2010 | Asplund et al. |
| 8,534,625 | B2 | * | 9/2013 | Heath et al. .............. 248/226.11 |
| 8,763,960 | B1 | * | 7/2014 | Moore et al. .................... 248/65 |
| 2006/0219269 | A1 | | 10/2006 | Rice et al. |
| 2008/0087301 | A1 | | 4/2008 | Lee et al. |
| 2008/0149141 | A1 | | 6/2008 | Sales |
| 2008/0216873 | A1 | | 9/2008 | Hjerpe et al. |

(Continued)

OTHER PUBLICATIONS

International Search Report and Written Opinion for PCT Application Serial No. PCT/US2014/024559, dated Jun. 25, 2014, 11 page.

*Primary Examiner* — Gerald L Sung
(74) *Attorney, Agent, or Firm* — Kinney & Lange, P.A.

(57) ABSTRACT

A retention system includes a structure clamp to connect the retention system to another structure; and a manifold clamp connected to the structure clamp, the manifold clamp including a trough to receive a pipe, a plurality of tube clamps with split cylinders extending through the trough, a collar to clamp around the pipe, and a spring to bias the trough from the collar.

21 Claims, 11 Drawing Sheets

(56) References Cited

U.S. PATENT DOCUMENTS

| | | |
|---|---|---|
| 2008/0272040 A1 | 11/2008 | Nordlund et al. |
| 2009/0260660 A1 | 10/2009 | Asplund et al. |
| 2010/0243001 A1 | 9/2010 | Amcoff et al. |
| 2011/0186096 A1 | 8/2011 | Nordlund et al. |
| 2011/0232697 A1 | 9/2011 | Amcoff et al. |
| 2011/0247501 A1 | 10/2011 | Nordlund et al. |
| 2012/0097443 A1* | 4/2012 | Mazelle et al. ............... 174/520 |
| 2012/0103375 A1 | 5/2012 | Alvestig et al. |
| 2014/0075957 A1* | 3/2014 | Boehne ........................ 60/797 |

* cited by examiner

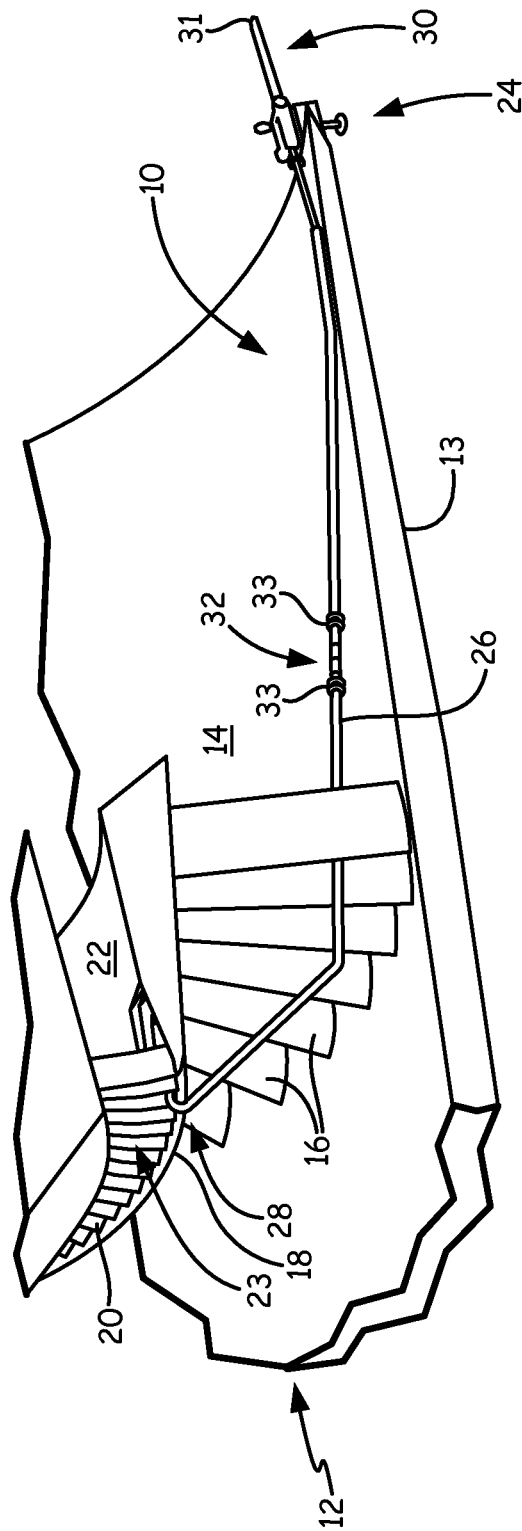

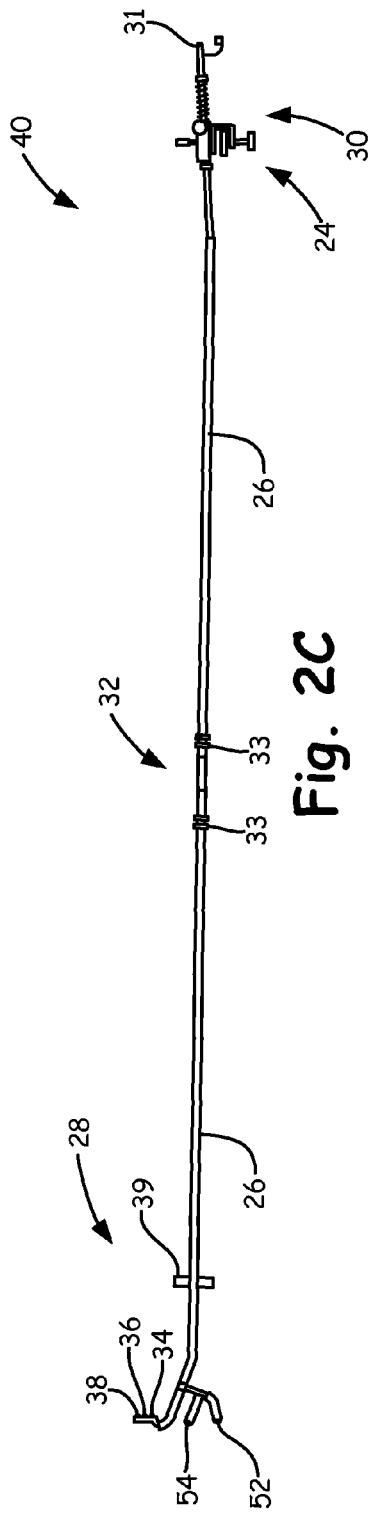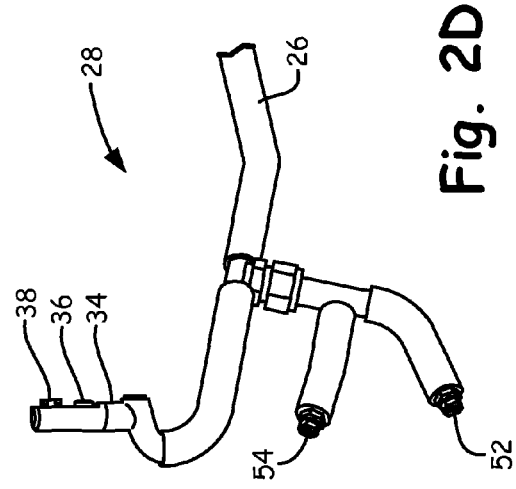

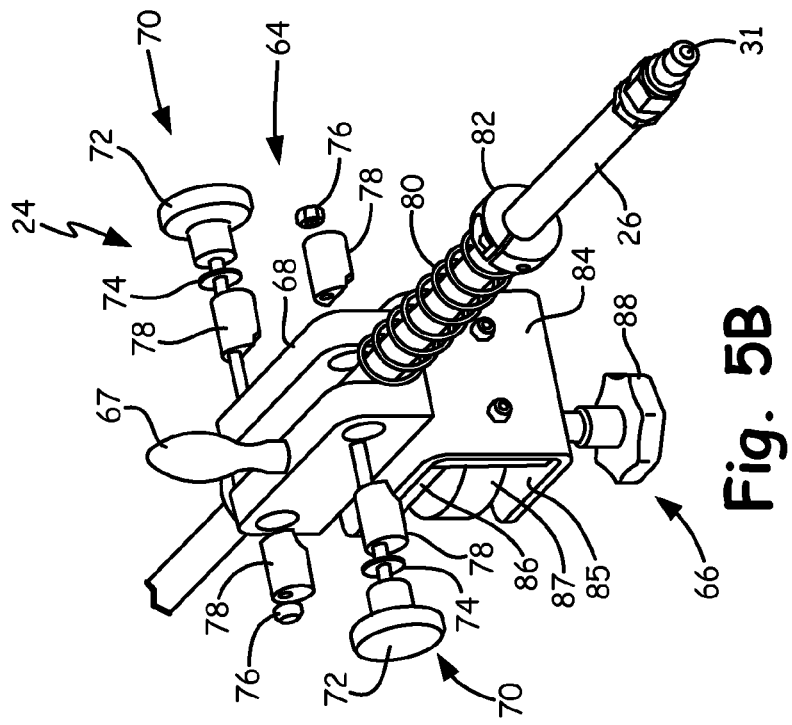
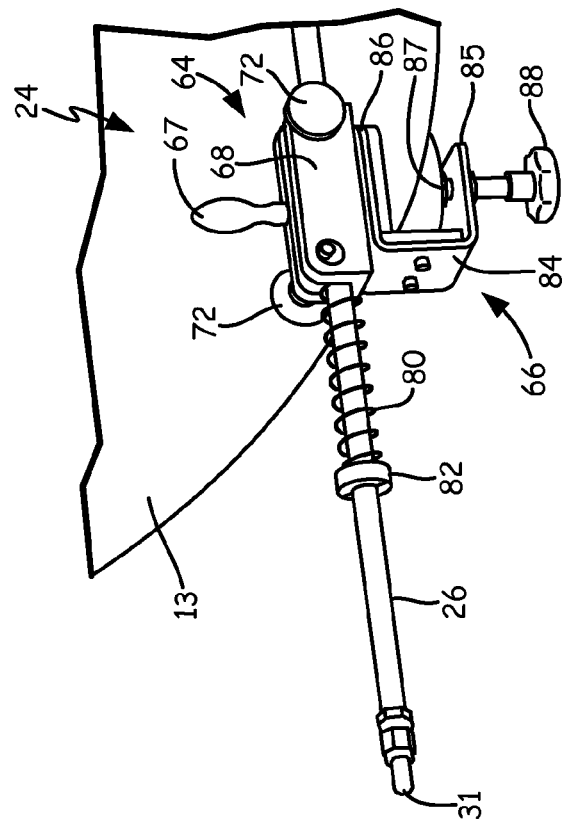
Fig. 5A
Fig. 5B

REAR MOUNTED WASH MANIFOLD RETENTION SYSTEM

BACKGROUND

Through use, gas turbine engines become subject to buildup of contaminants on engine components. These contaminants can affect engine components and overall performance of the engine. In order to improve efficiency, engine compressors and turbine sections are routinely cleaned.

Conventional engine washing can be done using an inlet mounted manifold for spraying wash fluid into the engine. The engine can be cranked, allowing the fluid to flow to through the core engine flowpath, removing contaminants.

SUMMARY

A retention system includes a structure clamp to connect the retention system to another structure; and a manifold clamp connected to the structure clamp, the manifold clamp including a trough to receive a pipe, a plurality of tube clamps with split cylinders extending through the trough, a collar to clamp around the pipe, and a spring to bias the collar from the trough.

A method of retaining a rear mounted manifold with a wash delivery pipe with a retention system includes connecting a collar and spring around the wash delivery pipe; placing the wash delivery pipe in a trough in a manifold clamp so that the spring biases the wash delivery pipe away from the manifold clamp; securing a plurality of tube clamps with split cylinders around the wash delivery pipe to secure the wash delivery pipe in the trough; and securing a structure clamp that is connected to the manifold clamp to another structure.

BRIEF DESCRIPTION OF THE DRAWINGS

FIG. 1A shows a perspective view of a rear mounted engine wash manifold connected to an engine with part of the engine cut-away for viewing purposes.

FIG. 2C shows a perspective view of the manifold of FIG. 2A.

FIG. 2D shows a close up portion of the manifold of FIG. 2D.

FIG. 5A shows a perspective view of a retention system for a rear mounted wash manifold.

FIG. 5B shows an exploded view of the retention system of FIG. 4A.

DETAILED DESCRIPTION

Figure 1B:
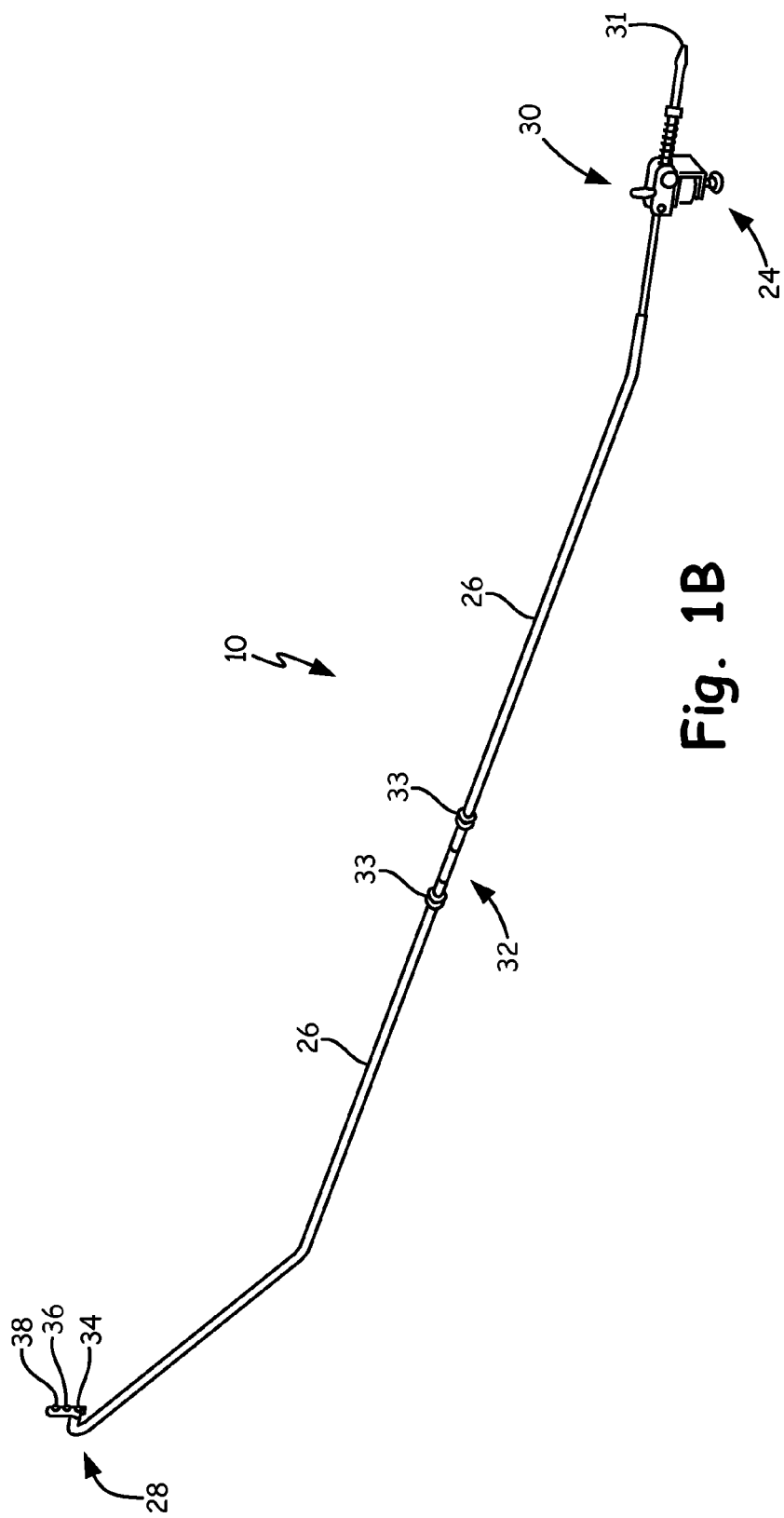
FIG. 1B shows a perspective view of the engine wash manifold of FIG. 1A.
Figure 1C:
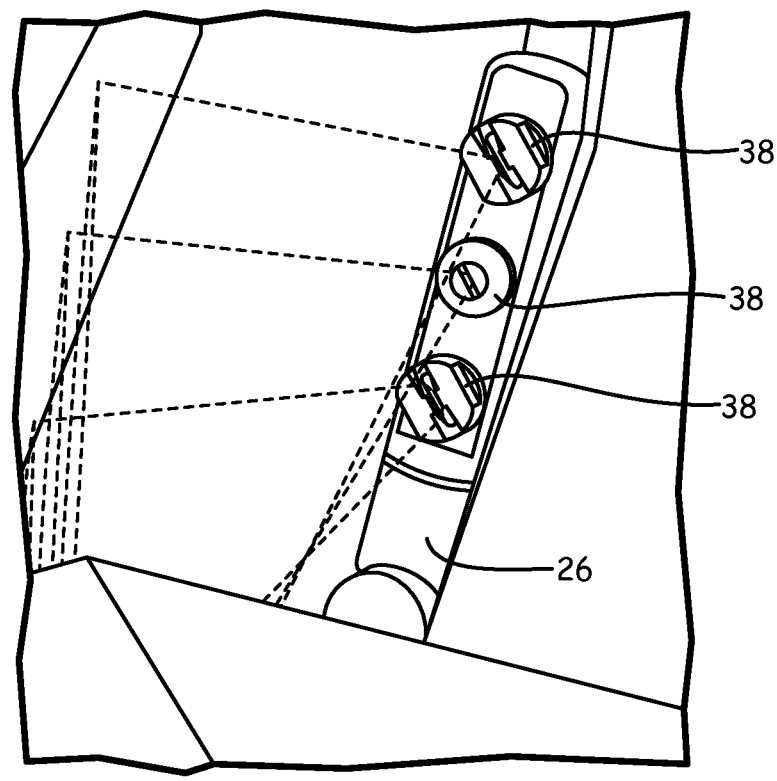
FIG. 1C shows a close-up view of a portion of the engine wash manifold of FIG. 1A

FIG. 1A shows a perspective view of a rear mounted engine wash manifold 10 connected to an engine 12 with part of the engine cut-away for viewing purposes. FIG. 1B shows a perspective view of engine wash manifold 10, and FIG. 1C shows a close-up view of a portion of the engine wash manifold 10. Portion of engine 12 shown includes case 13, bypass duct 14 with fan exit guide vanes 16, core inlet splitter 18, stators 20 and engine core 22 with core inlet 23. Manifold 10 includes retention system 24, wash delivery segment 26 with first end 28, second end 30 with inlet 31, connection 32 (with rings 33) and nozzles 34, 36, 38.

Wash delivery segment 26 of manifold is designed and shaped to at least partially follow curvature of the engine, specifically the inside curvature of case 13 which forms bypass duct 14. Second end 30 of manifold 10 includes inlet 31 to receive wash fluid. First end 28 of manifold is shaped to interface with core inlet splitter 18 and additionally includes nozzles 34, 36, 38. Nozzles 34, 36, 38 can atomize the wash fluid, and can be specifically angled, shaped and/or designed to bypass stators 20 and penetrate core 22 with spray consisting of desired properties based on engine, environment and other factors. Wash fluid may be deionized, heated, atomized, sized, directed and/or pressurized to be delivered at a specific flow rate and velocity to ensure effective cleaning and engine core penetration. Wash delivery segment 26 is a typically a pipe, covered with a coating to ensure it does not scratch and/or damage engine 12 components. Wash delivery segment 26 pipe can be made of stainless steel or other materials depending on system requirements. This coating can be a rubber coating, a plastic coating or other types of coating depending on system requirements. Second end 30 of manifold 10 also includes retention feature 24 (which will be discussed in detail in FIGS. 4A-4B) and inlet 31. Inlet 31 can be a quick coupling fitting for connection to a high forward hose from a wash unit (not shown).

In the embodiment shown, manifold 10 is formed of two portions, with connection 32 connecting the portions. This can be a quick-fit connection and can allow for easy disassembly, transporting of manifold 10 and/or storage. Connection 32 includes rubber rings or other protective material to ensure connection 32 components do no scratch and/or damage engine 10, as connection 32 components are typically metal.

Manifold 10 connects to engine 12 by entering bypass duct 14. First end 28 interfaces with core inlet splitter 18, positioning nozzles 34, 36, 38 to spray into engine core 22. As can be seen in FIG. 1C, nozzles 34, 36 and 38 are each angled and shaped differently to provide different cleaning capabilities to engine core. For example, nozzles 34, 36, 38 may be pointed toward different parts of engine core, dispense fluid at different rates and/or temperature, and/or may be completely different nozzle types. Retention system 24 connects to case 13 around bypass duct 14, securing manifold 10 with respect to engine 12.

Manifold 10 allows for rear mounted washing of engine 13 core 22 by shaping manifold 10 to interface with core inlet splitter 18 and bypass duct 14. This provides wash fluid directly to engine core inlet 23 by accessing core inlet 23 through bypass duct 13. Retention system 24 and the interface of manifold 10 first end 28 with core inlet splitter 18 ensure manifold 10 is secure during washing so that nozzles 34, 36, 38 can deliver fluid into core 22 as intended. Providing atomized wash fluid directly to core inlet 23 can ensure greater droplet penetration through compressor and turbine of engine 12 compared to conventional methods. Improved penetration of engine 12 core 22 can increase removal of contaminants, thus increasing engine 12 performance by decreasing engine temperatures, reducing fuel consumption, restoring engine power and improving overall engine 12 efficiency.

Figure 2A:
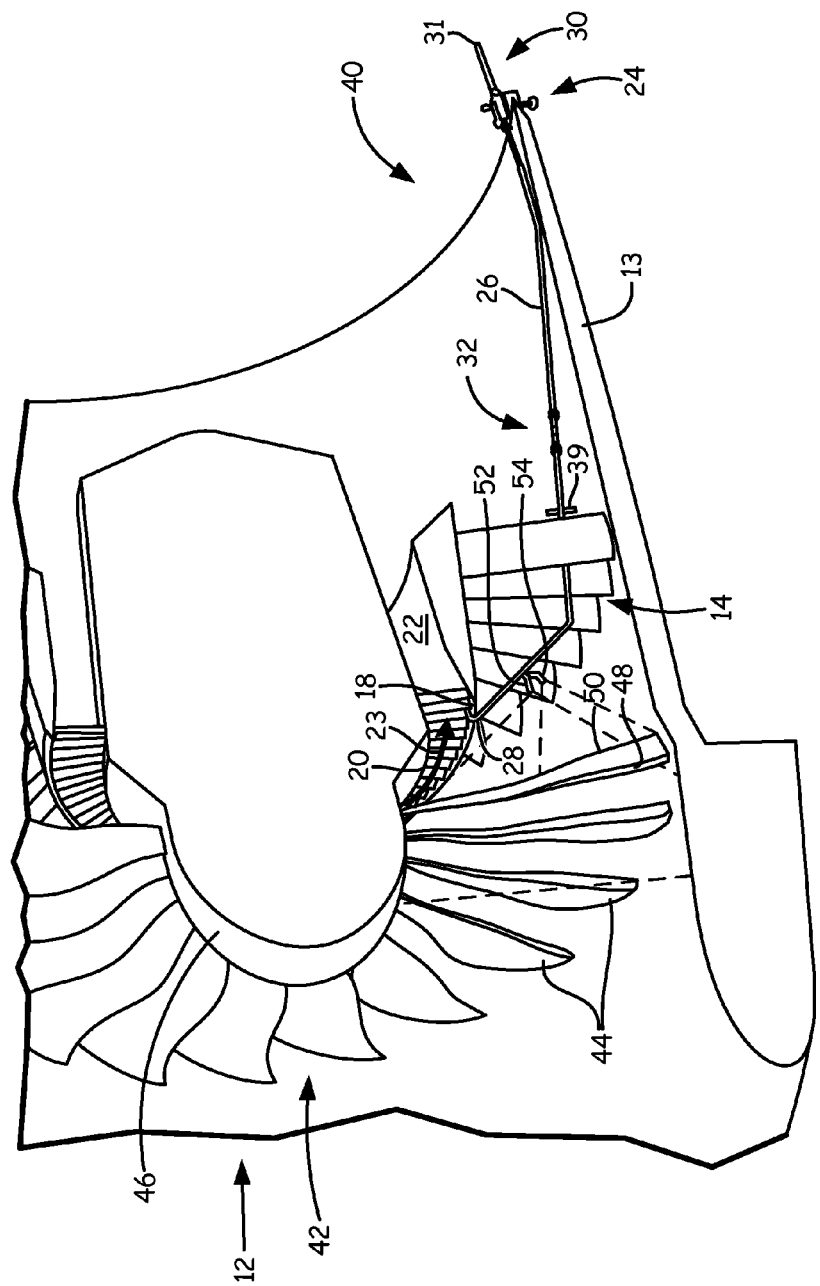
FIG. 2A shows a second embodiment of a rear mounted engine wash manifold connected to an engine with part of the engine cut-away for viewing purposes.
Figure 2B:
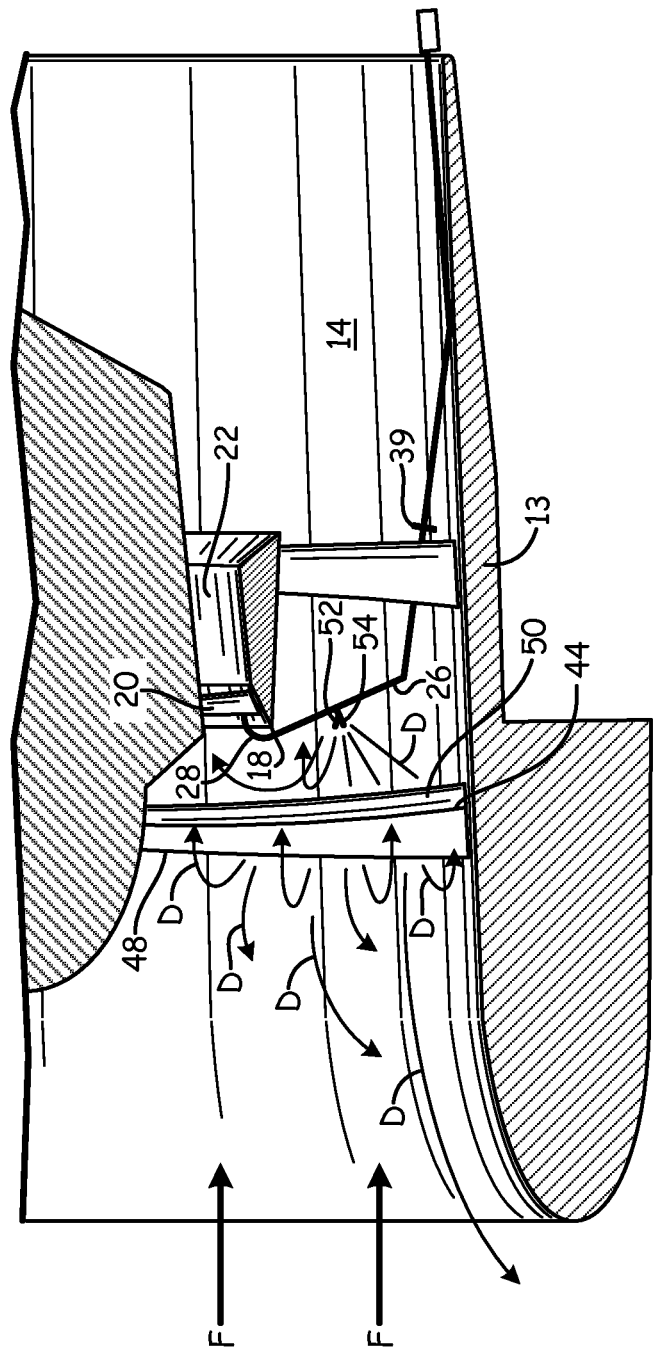
FIG. 2B shows a close up view of a portion of the manifold and engine of FIG. 2A.

FIG. 2A shows a second embodiment of a rear mounted engine wash manifold 40 connected to engine 12 with parts of the engine cut-away for viewing purposes. FIG. 2B shows a close up view of a portion of manifold 40 and engine 12 showing airflow F and wash fluid droplet flow path D. FIG. 2C shows a perspective view of the manifold 40, and FIG. 2D shows a close up view of first end 28 of manifold 40.

Similar parts are labeled with the same numbers as those in FIGS. 1A-1C. Portion of engine 12 shown includes case 13, bypass duct 14 with fan exit guide vanes 16, core inlet splitter 18, stators 20 and engine core 22 with core inlet 23, fan 42 with hub 46 and blades 44 (each blade 44 with forward side 48 and aft side 50). Manifold 40 includes retention system 24, wash delivery segment 26 with first end 28, second end 30 with inlet 31, connection 32 (with rings 33), core nozzles 34, 36, 38, fan nozzles 52, 54 and alignment bar 39. Also shown are arrows indicating engine airflow F and wash fluid droplet flowpath D.

Manifold 40 connects to case 13 which surrounds bypass duct 14 and to core inlet splitter 18 in the same way as described above in relation to FIGS. 1A-1C. Manifold 40 additionally has fan nozzles 52 and 54, which direct wash fluid at aft side 50 of fan blades 44 and alignment bar 39 which interfaces with fan exit guide vanes 16. While manifold 40 shows two fan nozzles 52, 54, a different number of fan nozzles may be used in other embodiments. One or more fan nozzles 52, 54 can be oriented to wash fan blade 44 from root to tip and can be angled to ensure all parts of the complex blade 44 surface geometry is contacted by wash fluid.

Alignment bar 39 can be connected to wash delivery segment 26 with thumb screws so that it is adjustable relative to wash delivery segment 26. Alignment bar 39 interfaces with fan exit guide vanes 16 to restrict forward extension of wash delivery segment 26, preventing wash delivery segment 26 from hitting (and possibly damaging) fan blades during installation. Alignment bar 39 additionally helps to secures wash delivery segment 26 relative to engine 12 for washing operations.

In some systems, engine can be cranked during washing creating airflow F shown in FIG. 2B. Wash fluid can be sprayed at such a flow rate and droplet size that it flows just beyond forward side 48 of fan blades and then is pulled back into engine by airflow caused by fan 42 rotation, causing the wash fluid to impact forward side 48 of blades 44 and then proceed to flow through engine core 22. The spray forward and/or droplet size of wash fluid through nozzles 52, 54 can be set to make wash fluid able to overcome fan air velocity to reach a leading edge of fan 42. The water droplets sprayed from nozzles 52, 54 may or may not extend beyond engine inlet 12, as shown in the example flow paths D of FIG. 2B.

Appropriate droplet size, pressure and other parameters used for dispensing wash fluid through nozzles 34, 36, 38, 52, 54 can vary depending on engine type, engine and/or environmental conditions and other factors. For example, nozzles 34, 34, 38 may most effectively clean core 22 with an atomized, high pressure, small droplet spray. For example, nozzles 34, 36, 38 could spray with a pressure of 13-275 bar (200-4000 psi), a droplet size of 50-250 μm, and a volumetric flow rate of 0.5-60 L/min (1-16 GPM) through each nozzle. In other embodiments, nozzles 34, 36, 38 could have a pressure of 50-80 bar (735-1175 psi) and a droplet size of 120-250 μm. Nozzles 52, 54 may provide an atomized, high pressure spray and/or a low pressure non-atomized spray. For example, nozzles 52, 54 may provide wash fluid at a pressure of 4-275 bar (60-4000 psi), droplet size of 50-2000 μm and/or a volumetric flow rate of 0.5-60 L/min (0.1-16 GPM) through each nozzle 52, 54.

By entering through bypass duct 14 and interfacing with core inlet splitter 18, manifold 40 allows for rear washing of fan 42, including direct washing of aft side 50. Past systems for washing aft side 50 of fan 42 included manually wiping down aft side 50 of fan blades 44 with a cloth. This is a time consuming process, as the blades 44 must be manually wiped down one by one. Manifold 40 allows for effective and efficient simultaneous washing of both engine core 22 (with nozzles 34, 36, 38) and aft side 50 of fan blades 44 (with nozzles 52, 54). Alignment bar 39 prevents damage from wash delivery segment going too far forward and hitting and possibly damaging fan 42 blades 44 during installation.

Figure 3:
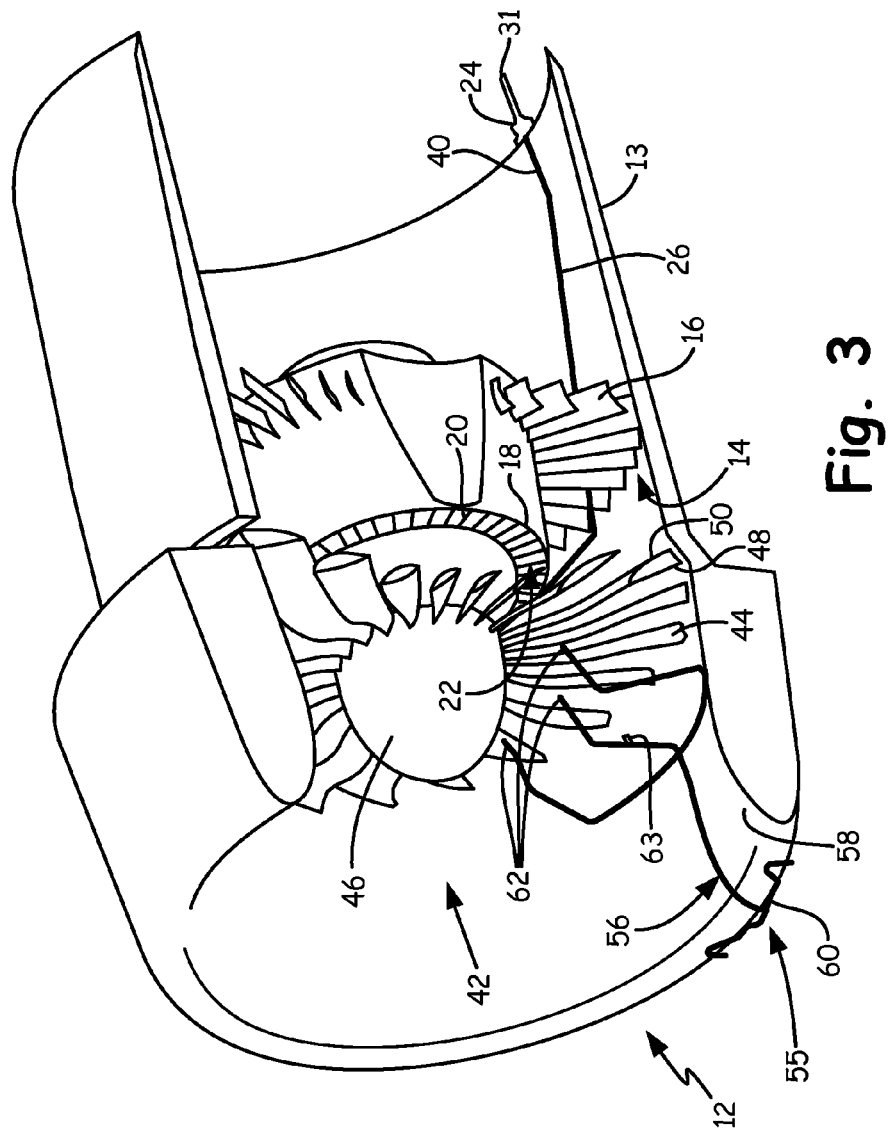
FIG. 3 shows the rear mounted engine wash manifold of FIG. 2A used in combination with a front mounted manifold.

FIG. 3 shows the washing system 55, including rear mounted engine wash manifold 40 used in combination with a front mounted manifold 56. Engine 12 includes case 13, bypass duct 14 with fan exit guide vanes 16, core inlet splitter 18, stators 20, core inlet 23, fan 42 with hub 46 and blades 44 (each blade 44 with forward side 48 and aft side 50) and nacelle 58. Manifold 40 includes retention system 24, wash delivery segment 26 with first end 28, second end 30 with inlet 31, core nozzles 34, 36, 38 (not visible) and fan nozzles 52, 54 (not visible). Manifold 56 includes retention structure 60 and nozzles 62, 63.

Manifold 56 connects to nacelle 58 through retention structure 60 to position nozzles 62, 63 to spray into engine 12 and at forward side 48 of fan blades 44. Manifold 56 can be connected to the same source of washing fluid as manifold 40, or can be connected to different sources. Manifold 56 is shown for example purposes only, and other inlet manifolds which spray into engine could be used in washing system 55.

By using both rear mounted manifold 40 and front mounted manifold 56, washing system 55 provides an efficient and effective wash to forward side 48 and aft side 50 of fan blades 44 and to engine core 22. Manifold 40 is positioned so that nozzles 52, 54 wash aft side 50 of blades 44 and nozzles 34, 36, 38 direct wash fluid straight into core 22. Manifold 56 uses nozzle 63 to spray forward side 48 of blade 44. Wash manifold 56 uses nozzles 62 to direct wash fluid through fan blades 44 and into core 22, though nozzles 62 can in some embodiments spray fan blades 44 as well. Wash fluid from manifold 56 is then pulled into engine with airflow (due to engine cranking) to wash engine 12 core 22 and fan 42.

Figure 4A:
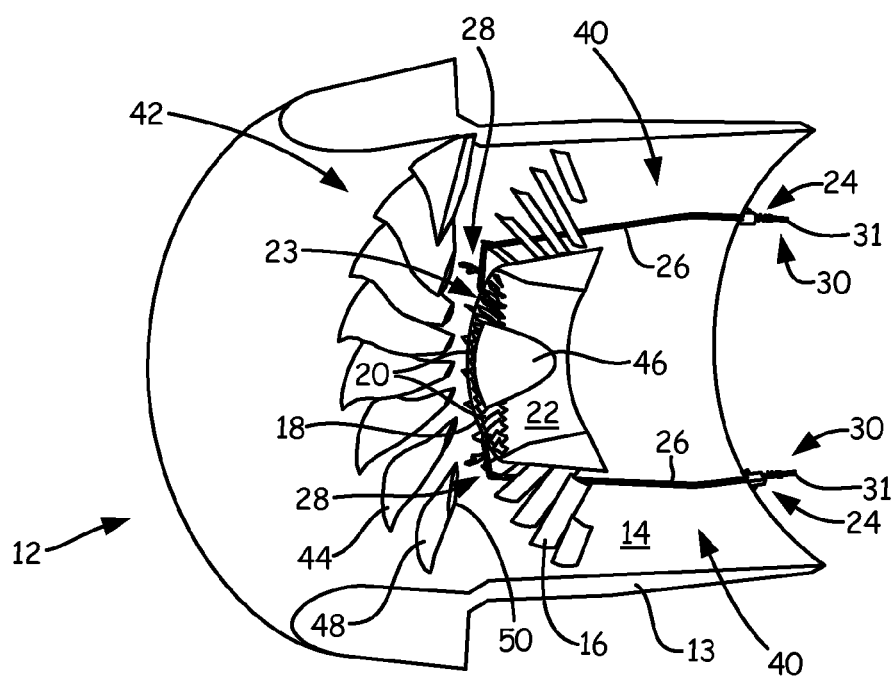
FIG. 4A shows a cross-sectional top view of an engine with a wash system including two rear mounted engine wash manifolds.
Figure 4B:
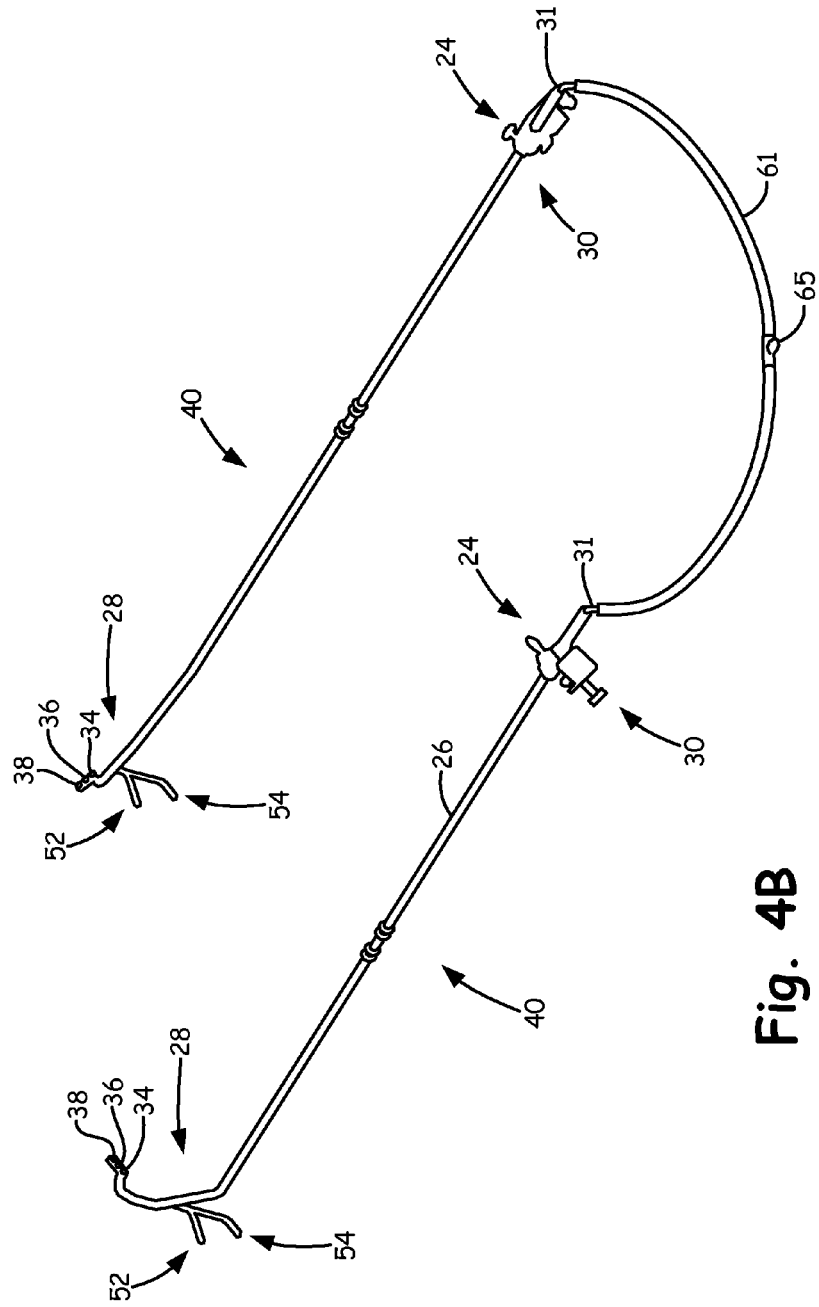
FIG. 4B shows a perspective view of the two wash manifolds of FIG. 4A connected by a hose.
Figure 4C:
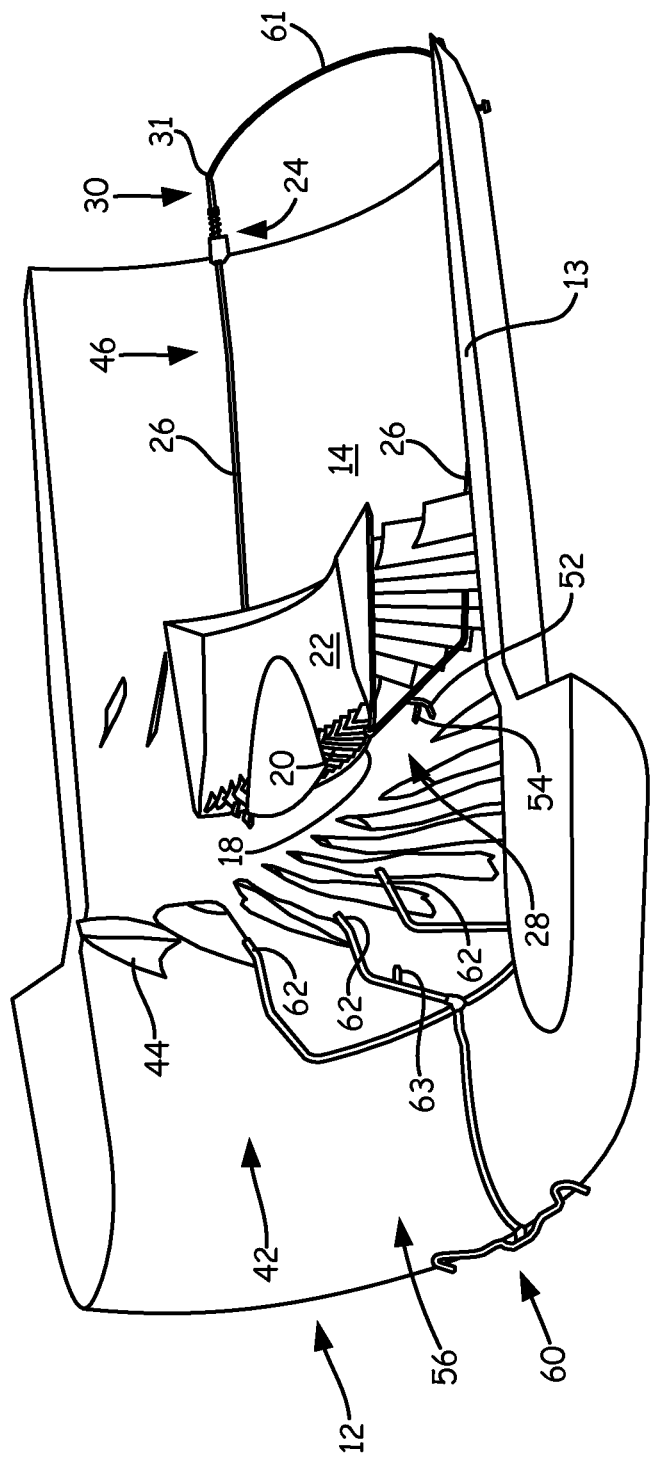
FIG. 4C shows the two rear mounted engine wash manifolds of FIG. 4A mounted to an engine in combination with a front mounted manifold, with part of the engine cut-away for viewing purposes.

FIG. 4A shows a cross-sectional top view of engine 12 with a wash system including two rear mounted engine wash manifolds 40, FIG. 4B shows a perspective view of wash manifolds 40 connected by hose 61, and FIG. 4C shows rear mounted engine wash manifolds 40 mounted to engine 12 in combination with front mounted manifold 56, with to part of the engine cut-away for viewing purposes.

FIGS. 4A-4C include engine 12 (with case 13, bypass duct 14 with fan exit guide vanes 16, core inlet splitter 18, stators 20 and engine core 22 with core inlet 23, fan 42 with hub 46 and blades 44 with forward side 48 and aft side 50), rear mounted manifolds 40 (with retention system 24, wash delivery segment 26 with first end 28, second end 30 with inlet 31, core nozzles 34, 36, 38 and fan nozzles 52, 54), hose 61 with inlet 65 and front mounted manifold 56 (with retention structure 60 and nozzles 62, 63). Inlet 65 can include a T-fitting to receive wash liquid and send it to each of manifolds 40.

Manifolds 40 connect to engine 12 and work to wash engine 12 the same as described in relation to FIGS. 2A-2D, and manifold 56 connects to engine 12 and works to wash engine 12 the same as described in relation to FIG. 3. In the embodiment shown in FIGS. 4A-4C, a plurality of rear mounted manifolds 40 work together to simultaneously deliver wash fluid to engine 12 core 22 and fan blades 42. Hose 61 connects rear mounted manifolds 40 together so that inlet 65 receives the wash fluid for delivery to engine 12 core 22 and fan 42.

Using a plurality of rear mounted manifolds 40 separately or in combination with a front mounted manifold 56 (as shown in FIG. 4C) can provide an efficient and thorough engine 12 cleaning. Using a plurality of rear mounted manifolds 40 can delivery more wash fluid to and around to different parts of engine core 22 and blades 44, which can be especially useful in large engines 12.

FIG. 5A shows a perspective view of retention system 24 connected to case 13 surrounding bypass duct 14, and FIG. 4B shows an exploded view of the retention system 24. Retention system 24 includes manifold clamp 64, case clamp 66 and handle 67. Manifold clamp 64 includes trough 68, tube clamps 70 (each with knob screw 72, washer 74, nut 76 and split cylinder 78), spring 80 and collar 82. Case clamp 66 includes bracket 84 (with first arm 85 and second arm 86), foot pad 87 and knob screw 88. Also shown is second end 30 of wash delivery segment 26 and inlet 31.

Collar 82 fits securely around wash delivery segment at second end 30. Trough 68 receives wash delivery segment 26 and spring 80 pushes wash delivery segment 26, and thus, whole manifold (10, 40) toward rear of engine 12 securing first end 28 against core inlet splitter 18 (see FIGS. 1A, 2A, 2B). Wash delivery segment 26 can slide forward and aft through trough 68. Tube clamps 70 can then secure wash delivery segment 26 in place by knob screw 72 connecting to nut 76 to tighten split cylinder segments 78 around wash to delivery segment 26. Split cylinder segments 78 are cylindrical, and can have ends which are angled or shaped to interface with the outer radius of wash delivery segment 26, to ensure wash delivery segment pipe 26 is held tightly, locking into place in trough 68. Tube claims 70 are also biased from opposing sides to ensure a secure connection. Manifold clamp 64 can be connected to case clamp 66 by bolting, welding or any other means. Handle 67 connects to manifold clamp 64, allowing one to easily place retention system 24 at desired location.

Case clamp 66 connects to and clamps around case 13, securing retention system 24 to case. Foot pad 87 can be rubber or another material to prevent scratching and should be a sufficient size to spread out force and ensure secure clamping. For example, foot pad 87 can have a diameter of 76.2 mm (3 inches). As shown in the embodiment of FIGS. 5A-5B, bracket 84 can be lined with plastic or another material to prevent scratching of case 13. Foot pad 87 is connected to the end of knob screw 88 and moves with knob screw 88. Knob screw 88 moves through bracket 84 first arm 85 to clamp case 13 between second arm 86 and foot pad 87, thereby securing retention system 24 to case 13. Manifold clamp 64 retains manifold 10, 40 by biasing wash delivery segment 26 with spring 80 and clamp 82 and further securing with tube clamp 70 with split cylinders 78.

Retention system 24 acts to secure rear mounted wash manifold 40 to case 13, with multi-locking retention features for stabilizing rear mounted manifold 40 during a washing operation while preventing damage from connection. Case clamp 66 secures retention system 24 to case without scratching or damaging case. Manifold clamp 64 secures wash delivery segment 26 and holds manifold 40 in place by biasing wash delivery segment with spring 80 and collar 82, allowing manifold to secure or hook onto core inlet splitter 18 on first end 28. Tube clamp 70 of manifold clamp 64 further secures wash delivery segment 26 using split cylinders 78 with surfaces that conform to wash delivery segment 26. Handle 67 ensures retention system 24 is easy to move and place where desired.

In summary, rear mounted manifold 10, 40, allows for effective and efficient engine 12 washing by spraying wash fluid directly into core 22 engine 12 and/or at fan 42. Wash delivery segment 26 can enter through bypass duct 14 and secure against core inlet splitter 18 and case 13 with retention system 24. Retention system 24, through the use of biasing spring 80, tube clamps 70 and case clamp 66 is able to hold manifold 10, 40 in place during washing operations. Wash delivery segment 26 can then deliver wash fluid through nozzles directly into core 22, improving penetration and washing of core engine components. Wash to delivery segment 26 can also deliver wash fluid toward aft side 50 of fan blades 44, spraying from behind and through fan 42. This rear washing of fan 42 blades 44 can efficiently remove contaminants from surfaces that were in past systems only occasionally manually cleaned, thereby resulting in an overall cleaner engine. This simultaneous washing of engine 12 core 22 and fan 42 provides a superior washing process which can increase engine performance by decreasing engine temperatures, reducing fuel consumption, restoring engine power and improving overall engine efficiency.

While retention system 24 is shown as used with rear mounted manifold 10, 40, it can be used with other systems that need secured. While manifolds 10, 40 are shown to connect to bypass duct 14, in other engines manifolds 10, 40 could connect to engine exhaust, a mixed bypass/exhaust duct or another structure rear of fan 42.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A retention system comprising:
   a structure clamp to connect the retention system to another structure; and
   a manifold clamp connected to the structure clamp, the manifold clamp including a trough to receive a pipe, a plurality of tube clamps each having at least two cylindrical clamp elements extending through the trough, a collar to clamp around the pipe, and a spring to bias the trough from the collar.

2. The retention system of claim 1, and further comprising:
   a handle connected to the manifold clamp.

3. The retention system of claim 1, wherein the structure clamp comprises:
   a bracket connected to the manifold clamp, the bracket with first and second arms;
   a knob screw extending through and able to move relative to the first arm of the bracket; and a foot pad on the end of the knob screw to clamp the structure between the foot pad and the second arm of the bracket.

4. The retention system of claim 3, wherein the foot pad is a rubber material or a compliant material configured to prevent scratching.

5. The retention system of claim 3, wherein the foot pad is circular shaped.

6. The retention system of claim 5, wherein the diameter of the foot pad is 76.2 mm (3 inches) in diameter.

7. The retention system of claim 3, wherein the bracket is lined with a rubber material or a plastic material or a compliant material configured to prevent scratching, on parts which connect to the structure.

8. The retention system of claim 1, wherein the plurality of tube clamps each having at least two cylindrical clamp elements comprises:
a first tube clamp to clamp around the pipe; and
a second tube clamp to clamp around the pipe.

9. The retention system of claim 1, wherein the cylindrical clamp elements are shaped to conform to the outer diameter of the pipe when clamping.

10. A method of retaining a rear mounted manifold with a wash delivery pipe with a retention system, the method comprising:
connecting a collar and spring around the wash delivery pipe;
placing the wash delivery pipe in a trough in a manifold clamp so that the spring biases the wash delivery pipe away from the manifold clamp;
securing a plurality of tube clamps each having at least two cylindrical clamp elements around the wash delivery pipe to secure the wash delivery pipe in the trough; and
securing a structure clamp that is connected to the manifold clamp to another structure.

11. The method of claim 10, wherein the step of securing a plurality of tube clamps each having at least two cylindrical clamp elements around the wash delivery pipe to secure the wash delivery pipe in the trough comprises:
tightening a knob screw of a first tube clamp extending from a first side of the trough to a second side of a threaded portion of the trough so that a first cylindrical clamp element secures around the wash delivery pipe; and
tightening a knob screw of a second tube clamp extending from a second side of the trough to a first side of another threaded portion of the trough so that a second cylindrical clamp element secures around the wash delivery pipe.

12. The method of claim 10, wherein the step of securing a structure clamp that is connected to the manifold clamp to another structure comprises:
placing the structure clamp so that the structure is between first and second arms of a bracket of the structure clamp;
tightening a knob screw extending through the first arm of the bracket so that a foot pad connected to the end of the knob screw contacts the structure, securing the structure bracket to the structure between the foot pad and the second arm of the bracket.

13. The method of claim 10, and further comprising:
placing the retention system in place with a handle connected to the trough.

14. An engine wash system with a manifold for delivering wash liquid to an engine with an inlet, a fan, a case with a bypass and a core inlet splitter, the manifold comprising:
a wash delivery segment comprising a pipe shaped to follow at least in part an engine case curvature with a first end to interface with the core inlet splitter and a second end with an inlet to receive wash fluid;
one or more nozzles on the wash delivery segment to spray wash fluid; and
a retention system to interface with the bypass duct and with the wash delivery to secure the manifold to a bypass duct outlet, wherein the retention system comprises:
a case clamp to connect the retention system to the case; and
a manifold clamp connected to the case clamp, the manifold clamp including a trough to receive the wash delivery segment, a plurality of tube clamps each having at least two cylindrical clamp elements extending through the trough, a collar to clamp around the wash delivery segment, and a spring to bias the collar from the trough.

15. The engine wash system of claim 14, and further comprising:
a handle connected to the manifold clamp to position the retention system.

16. The engine wash system of claim 14, wherein the case clamp comprises:
a bracket connected to at least one of the plurality of tube clamps, the bracket with first and second arms;
a knob screw extending through and able to move relative to the first arm of the bracket; and
a foot pad on the end of the knob screw to clamp the case between the foot pad and the second arm of the bracket.

17. The engine wash system of claim 14, the case clamp comprises a foot pad, wherein the foot pad is a rubber material or a compliant material configured to prevent scratching and is circular shaped.

18. The engine wash system of claim 14, wherein the plurality of tube clamps comprises:
a first tube clamp; and
a second tube clamp.

19. The engine wash system of claim 14, wherein the cylindrical clamp elements are shaped to conform to the outer diameter of the pipe when clamping.

20. The engine wash system of claim 14, wherein the one or more nozzles comprises at least one nozzle position to direct wash fluid at a rear of the fan.

21. The engine wash system of claim 14, and further comprising: one or more additional retention systems.

* * * * *

UNITED STATES PATENT AND TRADEMARK OFFICE
CERTIFICATE OF CORRECTION

| | | |
|---|---|---|
| PATENT NO. | : 9,212,565 B2 | Page 1 of 1 |
| APPLICATION NO. | : 13/799613 | |
| DATED | : December 15, 2015 | |
| INVENTOR(S) | : Kurt Dorshimer et al. | |

It is certified that error appears in the above-identified patent and that said Letters Patent is hereby corrected as shown below:

IN THE SPECIFICATION

Col. 1, Line 14
  Delete "to flow to"
  Insert --to flow--

Signed and Sealed this
Twelfth Day of April, 2016

Michelle K. Lee
*Director of the United States Patent and Trademark Office*